United States Patent

[11] 3,529,503

| [72] | Inventors | George W. Sederberg<br>Highland Heights, Kentucky;<br>James G. Wiatt, Cincinnati, Ohio |
|---|---|---|
| [21] | Appl. No. | 789,880 |
| [22] | Filed | Jan. 8, 1969 |
| [45] | Patented | Sept. 22, 1970 |
| [73] | Assignee | Cincinnati Milacron Inc.<br>Cincinnati, Ohio<br>a corporation of Ohio |

[54] CLOSURE DEVICE FOR MATERIAL CUTTING MACHINE
8 Claims, 4 Drawing Figs.

[52] U.S. Cl. .................................................. 83/146,
83/428, 83/455, 83/925
[51] Int. Cl. .................................................. B26d 7/02
[50] Field of Search ............................................ 83/111,
145, 146, 428, 455, 925CC

[56] References Cited
UNITED STATES PATENTS
3,304,820  2/1967  Muller et al. .................. 83/428X Primary Examiner—James M. Meister
Attorney—Frank C. Leach, Jr.

ABSTRACT: The area between a pair of hold down housings, which exert a force on the material being cut, is reduced by a closure device, which includes a pair of members disposed in spaced relation to each other with an additional member slidable therebetween and movable with the cutting blade in its transverse movement. The closure device, which exerts a hold down force on the material, is movable upwardly and downwardly with the hold down housings.

Patented Sept. 22, 1970

CLOSURE DEVICE FOR MATERIAL CUTTING MACHINE

In the copending patent application of Herman J. Baldwin and Phillip F. Stapf, Jr. for "Hold Down Apparatus For Material Cutting Machine", Ser. No. 757,011, filed September 3, 1968, and assigned to the same assignee as the assignee of the present application, there is shown a pair of hold down housings disposed on opposite sides of a cutting blade. The housings are supported for simultaneous raising and lowering relative to the material being cut. Each of the housings has an endless band or belt that engages the material. The total force exerted on the material by the housings is controlled.

It is necessary to space the hold down housings a distance from each other because the hold down housings must not have their endless bands or belts exerting a downward force on the material in an area in which the material is not supported by its lower support structures. The lower support structures for the material must be spaced a distance from each other to accommodate the lower support structure for the cutting blade, which moves transversely between the lower support structures for the material. Additionally, since the hold down housings must be raised upwardly from engagement with the material to allow removal of the material from the lower support structures and the loading of the material on the lower support structures upon completion of cutting of the material, the hold down housings must be spaced a distance to accommodate the upper support structure for the cutting blade including the support structure for the cutting blade guide.

As a result, there is an area in which the material being cut would tend to fluff or rise upwardly due to the downward force exerted on each side of this area by the hold down housings. It is necessary to limit this fluffing so that true patterns are cut in the material.

Furthermore, when the material is cut, it has a tendency to want to curl upwardly along its cut line. As a result, some of the material would not be disposed in the desired plane to form true cutting patterns therein thereafter. This also might result in some layers of the material being bent backwardly whereby jamming of the material cutting machine could occur.

The present invention satisfactorily solves the foregoing problems by utilizing a closure device to substantially reduce the area above the material being cut between the hold down housings without interfering with the upper support structure for the cutting blade and its guide when the hold down housings are lifted upwardly. Furthermore, the closure device of the present invention may be readily lifted with the hold down housings when material is to be loaded on or removed from a material cutting machine.

It is still necessary to leave a slight space between members of the closure device to allow the cutting blade to move transversely. However, this is a much smaller distance than the distance between the hold down housings.

Furthermore, the closure device of the present invention includes a hold down member that extends between the two members and is adapted to engage the material in the area in which the cutting blade is in cutting engagement with the material. This member is movable with the cutting blade so as not to block movement by the cutting blade in the transverse direction.

As a result of utilizing this additional member that is movable with the cutting blade, any lifting force exerted by the cutting blade on the material during reciprocation with the material being cut is negated. Therefore, the closure device of the present invention permits a true pattern to be cut in the material since the material remains in a plane perpendicular to the reciprocating motion of the cutting blade.

An object of this invention is to provide a closure device that substantially reduces the area of the material, which is being cut, that does not have any hold down pressure exerted thereon.

Another object of this invention is to provide a closure device that exerts a force on the material being cut.

A further object of this invention is to provide a device that prevents material, which is being cut by the reciprocating motion of a cutting blade, from being lifted during cutting.

Other objects of this invention will be readily perceived from the following description, claims, and drawings.

This invention relates to a material cutting machine comprising means to support material for cutting by cutting means. The machine has first means adjacent one side of the cutting means with the first means disposed above the material and exerting a downward force on the material supported by the material supporting means and second means adjacent the other side of the cutting means with the second means disposed above the material and exerting a downward force on the material supported by the material supporting means. Closure means is disposed between the first and second means to substantially close the area therebetween above the material supported on the material supporting means. The closure means, which exerts a downward force on the material, includes means to receive the cutting means. The closure means is supported by suitable means.

The attached drawings illustrate a preferred embodiment of the invention, in which.

Figure 1:
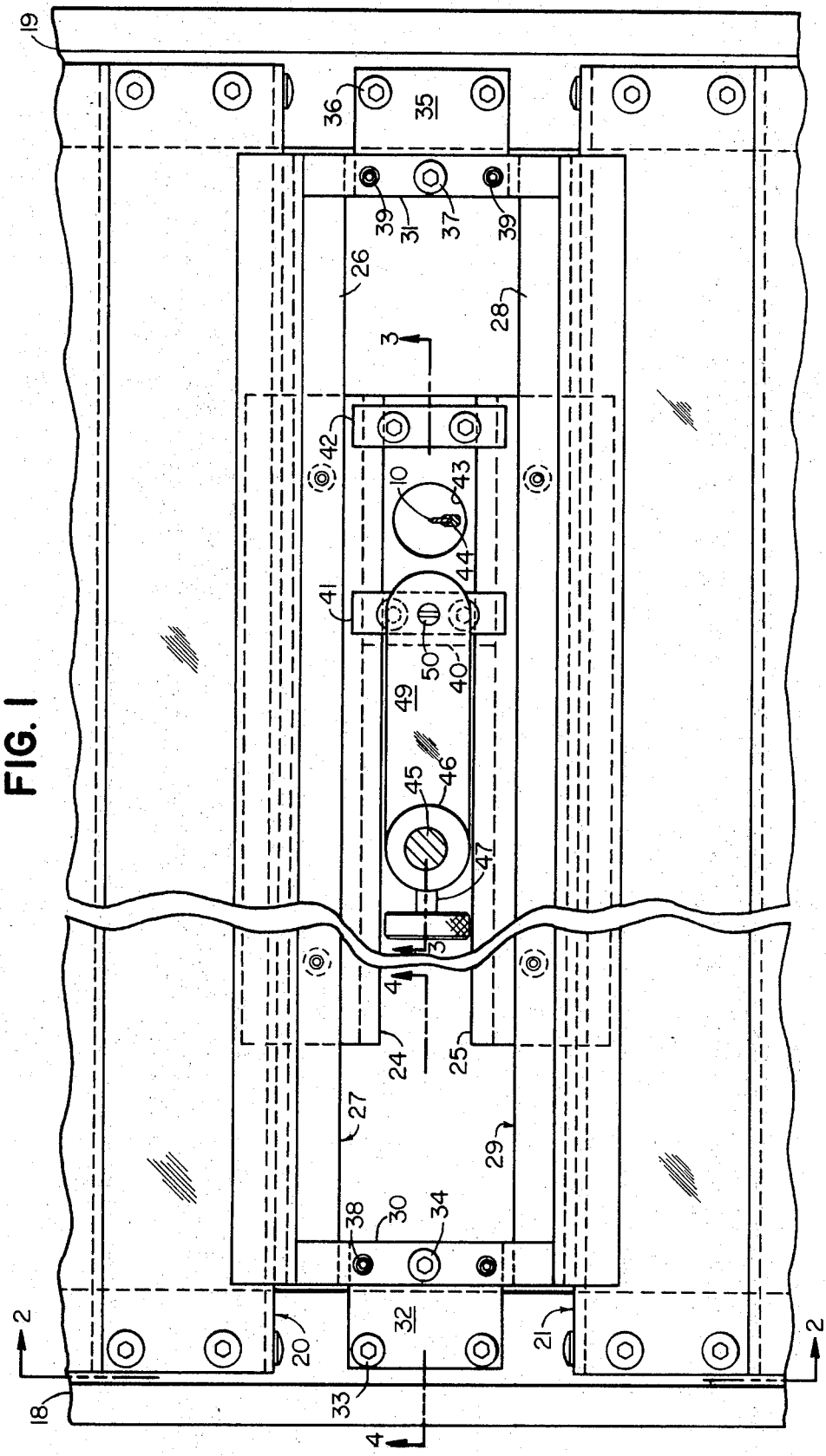
FIG. 1 is a top plan view of a portion of a material cutting machine utilizing the closure device of the present invention.
Figure 3:
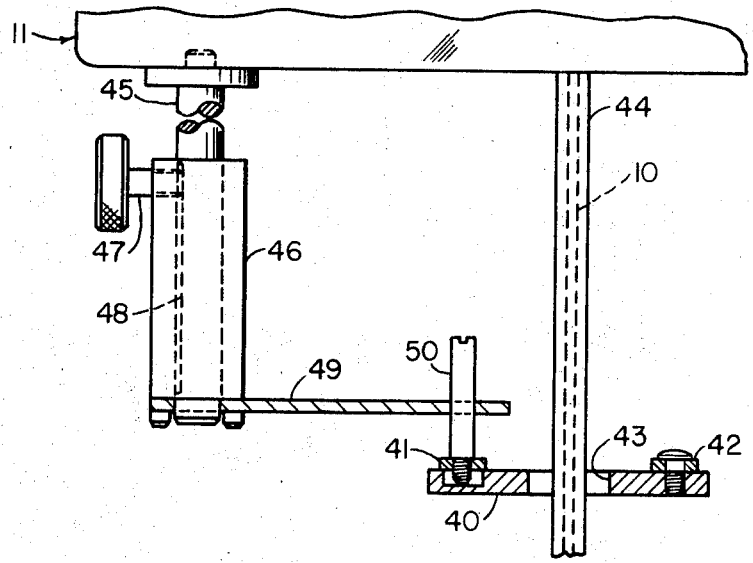
Figure 4:
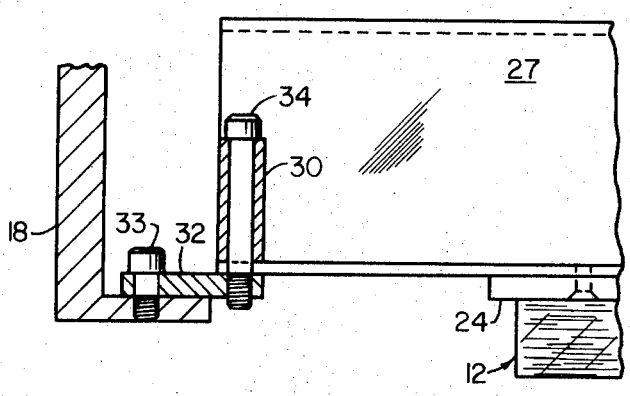

FIG. 3 is a sectional view, partly in elevation, showing the arrangement for moving a sliding portion of the closure device with the cutting blade during its transverse movements and taken along line 3—3 of FIG. 1; and FIG. 4 is a sectional view, partly in elevation, showing the arrangement for connecting the closure device of the present invention to its support structure and taken along line 4—4 of FIG. 1.

Referring to the drawings, there is shown a material cutting machine of the type more particularly shown and described in the copending patent application of George W. Sederberg for "Material Cutting Machine Having Reciprocating Cutting Blade Adapted To Enter Material Without An Entrance cut", Ser. No. 726,657, filed May 6, 1968, and assigned to the same assignee as the assignee of the present application. The material cutting machine has a reciprocating cutting blade 10, which is reciprocated by an electric motor as more particularly shown and described in the aforesaid Sederberg application.

The motor is disposed within a housing 11 (see FIG. 3), which supports the cutting blade 10. As more particularly shown and described in the aforesaid Sederberg application, the housing 11 is movable in a transverse direction to move the cutting blade 10 transversely relative to material 12 (see FIG. 2), which may be a plurality of layers of cloth, for example.

As more particularly shown and described in the aforesaid Sederberg application, the material 12 is supported on endless bands 14 and 15 and throat way sections 16 and 17. The gap, which is formed between the throat way sections 16 and 17, may be closed in the manner more particularly shown and described in the aforesaid Sederberg application. The bands 14 and 15 are driven in unison to move the material 12 longitudinally relative to the cutting blade 10 as more particularly shown and described in the aforesaid Sederberg application.

The material cutting machine includes a pair of L-shaped supports 18 and 19 (see FIG. 1), which are disposed on opposite sides of the endless bands 14 and 15. The L-shaped supports 18 and 19 are mounted for vertical movement in the manner more particularly shown and described in the aforesaid Baldwin et al. application.

A hold down housing 20 has one end fixed to the L-shaped support 18 for support thereby and its other end fixed to the L-shaped support 19 for support thereby. A hold down housing 21, which is disposed on the opposite side of the cutting blade 10 from the housing 20, has one end fixed to the L-shaped support 18 for support thereby and its other end fixed to the L-shaped support 19 for support thereby.

The housing 20 has a flexible endless band or belt 22 supported therein in the manner more particularly shown and described in the aforesaid Baldwin et al. application. The housing 21 has an endless band or belt 23 supported therein in the manner more particularly shown and described in the Baldwin et al. application.

The endless bands 22 and 23 are positioned in engagement with the top of the material 12 and exert a predetermined force thereon in the manner more particularly shown and described in the aforesaid Baldwin et al. application. The force, which the bands 22 and 23 exert on the material 12, is controlled in the manner more particularly shown and described in the aforesaid Baldwin et al. application.

The closure device of the present invention includes a pair of parallel members 24 and 25, which extend the length of the distance through which the cutting blade 10 can be moved transversely and are spaced from each other to provide an area through which the cutting blade 10 may move transversely relative to the material 12. The members 24 and 25 reduce the area between the hold down housings 20 and 21 above the material 12.

The member 24 is secured to a lower flange 26 of a member 27 while the member 25 is secured to a lower flange 28 of a member 29. The members 27 and 29 are connected to each other to form a unitary frame. One end of each of the members 27 and 29 is fixed to a block 30 while the other end of each of the members 27 and 29 is fixed to a block 31.

One end of the frame is supported on the L-shaped support 18 by having the block 30 connected to a plate 32, which is secured to the base of the L-shaped support 18 by screws 33, by a screw 34. A similar arrangement exists for the other end of the frame wherein the block 31 is connected to a plate 35, which is secured to the base of the L-shaped support 19 by screws 36, by a screw 37.

Figure 2:
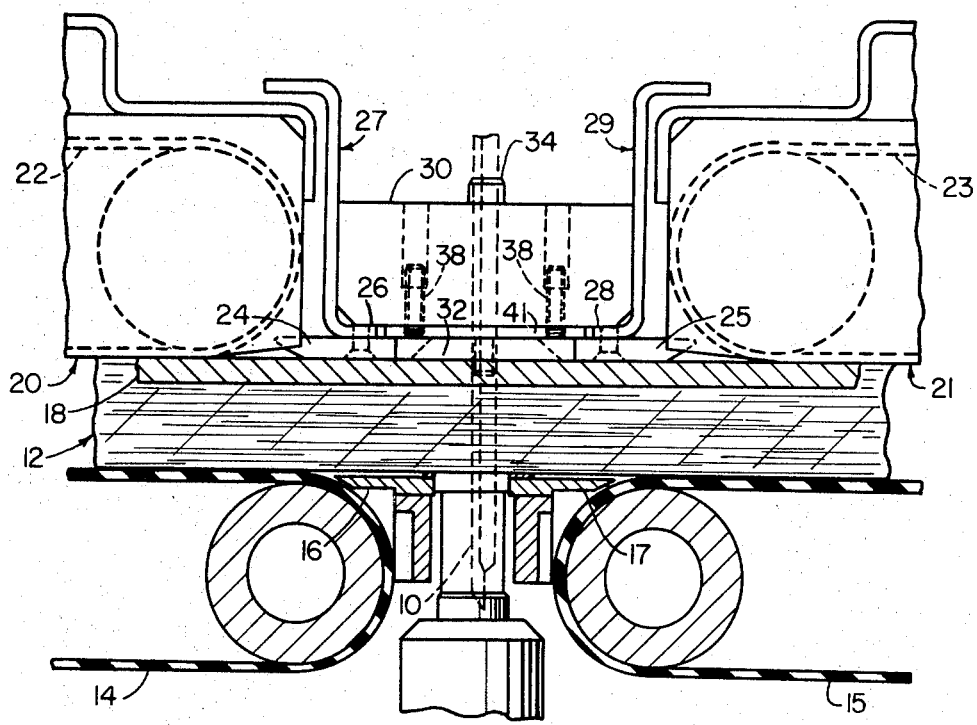
FIG. 2 is an end elevational view, partly in section, showing the mounting arrangement of the closure device of the present invention and taken along line 2—2 of FIG. 1.

As shown in FIG. 2, the member 24 is supported by the frame so that it is spaced only a slight distance from the endless band 22 of the hold down housing 20. Similarly, the member 25 is supported by the frame so that it is spaced only a slight distance from the endless band 23 of the hold down housing 21.

The position of the frame with respect to the plate 32 may be adjusted vertically by means of jacking screws 38. Likewise, the position of the frame with respect to the plate 35 may be adjusted vertically by means of jacking screws 39. Thus, the frame, which supports the members 24 and 25, may be vertically adjusted. Accordingly, the force with which the members 24 and 25 engage the material 12 may be varied as desired.

Additionally, the thickness of each of the plates 32 and 35 could be varied if desired. This also will change the position at which the members 24 and 25 engage the top of the material 12.

It should be understood that a total downward force on the material 12 is exerted by the housings 20 and 21 and the closure device of the present invention. Thus, if the force exerted by the closure device is increased, the force exerted by the housings 20 and 21 is decreased the same amount.

The members 24 and 25 have their sides, which are closest to each other, inclined to form a cooperating dovetail arrangement with a member 40, which is slidably disposed therebetween. The member 40 is mounted for movement with the cutting blade 10.

The member 40 is supported on the members 24 and 25 by means of bars 41 and 42, which are fixed to the upper surface of the member 40. As shown in FIGS. 1 and 2, each of the bars 41 and 42 overlies a portion of the upper surfaces of the members 24 and 25.

The member 40 has an opening 43 formed therein to receive the cutting blade 10 and its guide 44. Thus, the member 40 engages the material 12 adjacent the cutting blade 10. The member 40 prevents any lifting of the material 12 adjacent the cutting blade 10 as this area is completely closed except for the opening 43.

The member 40 is preferably formed of a lightweight material such as Plexiglas, for example. Any other suitable material may be employed although it is preferred that the material be both transparent and lightweight.

The member 40 is maintained in alignment with the cutting blade 10 by being attached to the housing 11, which supports the cutting blade 10 and moves it transversely, for movement therewith. The connection between the member 40 and the housing 11 includes a rod 45, which extends downwardly from the housing 11 and is fixed thereto. A hollow cylindrical member 46 is slidably mounted on the rod 45 and retained in a desired vertical position thereon by a set screw 47, which is threadedly mounted in the hollow cylindrical member 46, engaging a flat surface 48 of the rod 45.

The hollow cylindrical member 46 is fixed by screws, for example, to a plate 49. A rod 50, which extends through an opening in the plate 49, is fixed to the bar 41 whereby transverse movement of the plate 49 with the cutting blade 10 is transmitted to the member 40 to cause it to slide between the members 24 and 25.

The vertical position of the plate 49 with respect to the member 40 is adjustable through positioning the hollow cylindrical member 46 on the rod 45 by means of the set screw 47. This adjustment is necessary to dispose the plate 49 in accordance with the vertical position of the member 40; the vertical position of the member 40 depends upon the thickness of the material 12. Furthermore, due to the vertical sliding arrangement between the plate 49 and the rod 50, the member 40 may be lifted upwardly towards the plate 49 when the L-shaped supports 18 and 19 are raised.

Considering the operation of the material cutting machine with the closure device of the present invention, the cutting blade 10, which is rotatable, may be moved transversely from its position of FIG. 1 wherein it is in its rightmost position while the material 12 may be moved longitudinally through driving the endless bands 14 and 15 in unison in the manner more particularly shown and described in the aforesaid Sederberg application. Whenever the cutting blade 10 moves transversely, the member 40 moves transversely therewith. Thus, the area of the material 12 adjacent the cutting blade 10 is completely engaged by the closure device of the present invention whereby the material 12, which is being cut, cannot be lifted upwardly by the reciprocation of the cutting blade 10.

By changing the position of the support frame for the members 24, 25, and 40, the force exerted by the members 24, 25, and 40 may be varied slightly. Likewise, changing the thickness of each of the plates 32 and 35 also can change the force with which the members 24, 25, and 40 engage the material.

While the closure device of the present invention has been shown and described as having a third member slidably supported between the members 24 and 25 and disposed in the same plane as the members 24 and 25, it should be understood that the third member could be replaced by other types of closure means that are not supported by the members 24 and 25. For example, the hold down plate of the copending patent application of Herman J. Baldwin for "Hold Down Plate For Use With Material Cutting Machine", Ser. No. 726,782, filed May 6, 1968, and assigned to the same assignee as the assignee of the present application could be employed. It is only desired that the closure device include some type of means to close the area adjacent the cutting blade 10.

While the closure device of the present invention has been described with respect to a reciprocating cutting blade of the type shown and described in the aforesaid Sederberg application, it should be understood that the closure device of the present invention may be readily utilized with any material cutting machine having a cutting blade.

An advantage of this invention is that it substantially reduces the area adjacent the cutting blade in which there is no means to hold down the material being cut. Another advantage of this invention is that it reduces the tendency of the material, which has already been cut, to curl up when it enters the area between the hold down housings.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A material cutting machine comprising:
    cutting means;
    means to support material to be cut by said cutting means;
    first means adjacent one side of said cutting means, said first means being disposed above the material and exerting a downward force on the material supported by said material supporting means;
    second means adjacent the other side of said cutting means, said second means being disposed above the material and exerting a downward force on the material supported by said material supporting means;
    closure means disposed between said first means and said second means to substantially close the area therebetween above the material supported on said material supporting means, said closure means exerting a downward force on the material;
    said closure means including means to receive said cutting means; and
    means to support said closure means.

2. The material cutting machine according to claim 1 in which said support means for said closure means adjustably supports said closure means for movement toward and away from the material.

3. The material cutting machine according to claim 1 including:
    first vertically movable means to support one side of each of said first and second means;
    second vertically moving means to support the other side of each of said first and second means;
    said first and second vertically movable means being movable in unison toward and away from the material; and
    said support means includes:
        means to support one side of said closure means on said first vertically movable means; and
        means to support the other side of said closure means on said second vertically movable means.

4. The material cutting machine according to claim 2 including:
    first vertically movable means to support one side of each of said first and second means;
    second vertically movable means to support the other side of each of said first and second means;
    said first and second vertically movable means being movable in unison toward and away from the material; and
    said adjustable support means includes:
        means to support one side of said closure means on said first vertically movable means; and
        means to support the other side of said closure means on said second vertically movable means.

5. The material cutting machine according to claim 1 including:
    means to produce relative movement in a longitudinal direction between said material supporting means and said cutting means to move one of the material on said material supporting means and said cutting means relative to the other in a longitudinal direction;
    means to produce relative movement in a transverse direction between said cutting means and said material supporting means in coordination with said longitudinal relative moving means to move one of the material on said material supporting means and said cutting means relative to the other in a transverse direction; and
    said closure means includes:
        a pair of members disposed on opposite sides of said cutting means;
        means to connect said pair of members to said first and second means;
        means disposed between said pair of members to receive said cutting means; and
        said disposed means being movable between said pair of members when there is relative transverse movement between said cutting means and said material supporting means.

6. The material cutting machine according to claim 5 in which:
    said transverse relative moving means moves said cutting means transversely while said material supporting means is stationary in the transverse direction; and
    means connects said disposed means of said closure means to said transverse relative moving means for transverse movement with said cutting means.

7. The material cutting machine according to claim 5 in which said disposed means of said closure means is a third member supported between said pair of members and slidable therebetween.

8. The material cutting machine according to claim 5 including:
    means to support said pair of members in fixed relation to each other;
    first means to secure said support means to said first vertically movable means;
    second means to secure said support means to said second vertically movable means;
    third means to adjustably position said support means vertically relative to said first securing means;
    fourth means to adjustably position said support means vertically relative to said second securing means; and
    said third and fourth means cooperating to adjust the vertical position of said closure means relative to the material to vary the force exerted on the material by said closure means.